United States Patent [19]

Holmberg

[11] Patent Number: 5,391,649

[45] Date of Patent: Feb. 21, 1995

[54] AQUEOUS, AUTOXIDATIVELY-DRYING ALKYD COMPOSITION CONTAINING POLYUNSATURATED ALKANOLAMIDE EMULSIFIER

[75] Inventor: Krister Holmberg, Mölndal, Sweden

[73] Assignee: Berol Nobel AB, Stenungsund, Sweden

[21] Appl. No.: 66,030

[22] Filed: May 21, 1993

[30] Foreign Application Priority Data

Nov. 23, 1990 [SE] Sweden .............................. 9003731-8

[51] Int. Cl.$^6$ ..................... C09D 167/08; B01F 17/22
[52] U.S. Cl. ....................................... 523/501; 523/503;
524/238; 106/252; 427/385.5
[58] Field of Search ................. 523/503, 501; 524/238

[56] References Cited

U.S. PATENT DOCUMENTS 3,979,346 9/1976 Zuckert et al. ..................... 106/252

FOREIGN PATENT DOCUMENTS 10000087 12/1978 European Pat. Off. .
61114728 6/1986 Japan .
531894 2/1973 Switzerland .

OTHER PUBLICATIONS

Chemical Abstract 102:168698g, "Cleaning Agents".

*Primary Examiner*—Frederick Krass
*Attorney, Agent, or Firm*—Spencer, Frank & Schneider

[57] ABSTRACT

An alkyd composition which is one of an aqueous emulsion or an aqueous microemulsion and which is autoxidatively drying, including an alkyd which is autoxidatively-drying; and an emulsifier which at least partly consists of an alkoxylate of monoalkanolamide of the general formula:

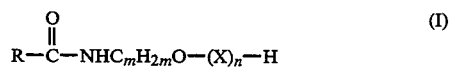

wherein R is a polyunsaturated alkyl group having 7-23 carbon atoms, X is an alkyleneoxy group derived from an alkylene oxide having 2-3 carbon atoms, m is 2-4, and n is 2-30.

10 Claims, No Drawings

AQUEOUS, AUTOXIDATIVELY-DRYING ALKYD COMPOSITION CONTAINING POLYUNSATURATED ALKANOLAMIDE EMULSIFIER

BACKGROUND OF THE INVENTION

1. Field of the Invention

The present invention relates to an autoxidatively drying alkyd composition containing an emulsifier in the form of a curing alkoxylate of a monoethanolamide.

2. Description of the Related Art

Alkyds have long been used as binders in paints and lacquers, and are employed in both professional and hobby painting, as well as in industrial lacquering. They may be the only binder used, as in air-drying paints, or be combined with e.g. amino resins, as is common in many stove-curing systems.

Alkyds are produced by condensation of a polybasic acid, a polyefunctional alcohol and a fatty acid. The polyfunctional components form the coherent polymer skeleton, and the fatty-acid residues settle as tails on the skeleton. Polyunsaturated fatty acids yield autoxidatively curing, i.e., air-drying, binders, whereas saturated and only slightly unsaturated fatty acids yield alkyds for stove-curing.

Even today, alkyds constitute the binder that is most commonly used in paints and lacquers. In recent years, however, environmental and health reasons have made it desirable to change from hydrocarbon-base to water-base paints, and the alkyd paints have thus lost market shares to latex paints, i.e., paints based on emulsion-polymerised binders, such as polyacrylate and polyvinyl acetate. This change has been especially pronounced in professional painting where the painters' health has always been a major problem. Thus, it is mainly the autoxidatively curing alkyds that have been affected. The solvent currently used in such paints is white spirit.

Thus, the alkyd manufacturers have tried to adapt themselves to this development by making emulsions of alkyds. Accordingly, the alkyd is first produced in conventional manner, and is then emulsified in water. This requires the presence of a surface-active agent, usually in a content of 0.5–4% by weight of the finished paint. The surface-active agent acts as emulsifier, i.e., it contributes to the formation of droplets of the disperse phase and it stabilises the structure by forming, on the droplets, an elastic surface film which reduces the tendency towards coalescence. With the right emulsifier, alkyd emulsions of long storage life can be obtained. Surface-active agents commonly used for this purpose are alkyl phenol ethoxylate and alcohol ethoxylate having HLB values in the range of 8–15. The HLB value (Hydrophilic Lipophilic Balance) is often used for indicating the amphiphilic nature of a surface-active agent.

The use of alkyds in emulsion systems eliminates the hazard of hydrocarbon emission from paints, but at the same time creates other inconveniences for the user.

The emulsifier acts as an external plasticiser in the film of paint. Being surface-active and low-molecular, the emulsifier migrates to the air-paint film of the interface, where it accumulates. As a result, the film becomes softer and its water and chemical resistance is impaired compared with a conventional white-spirit-base paint based on the same alkyd as the binder. Also, the presence of a surface-active agent tends to impair the clarity and gloss of the film, as well as its drying qualities.

Besides the development towards emulsion-base alkyd paints, intensive efforts are being made to produce micro-emulsions of alkyds and use these thermodynamically stable solutions as raw material. Thus, microemulsions constitute an alternative to emulsions when alkyds are to be introduced in a water-base system. Microemulsions differ from emulsions by being thermodynamically stable, i.e., having no tendency to separate when stored, which is a major advantage. However, the production of a microemulsion requires a much larger amount of surface-active agent than does the production of an emulsion. Thus, the emulsifier problems in the form of impaired film properties and reduced drying rate are especially pronounced in the case of alkyds used in paints.

SUMMARY OF THE INVENTION

The present invention relates to a method for producing aqueous emulsions and microemulsions of autoxidatively curing alkyds resulting in better film properties than has been the case with the prior-art techniques. The invention is based on the idea that the emulsifier employed is an alkoxylate of monoalkanolamide of drying carboxylic acids, i.e., compounds of the general formula:

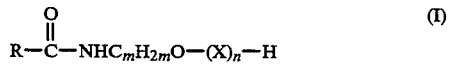
(I)

wherein R is a polyunsaturated alkyl group having 7–23 carbon atoms, preferably 9–21 carbon atoms, X is an alkyleneoxy group derived from an alkylene oxide having 2–3 carbon atoms, m is 2–4, preferably 2, and n is 2–30, preferably 3–20. The emulsifier usually amounts to 0.5–25% by weight of the prepared alkyd composition. If the alkyd composition is an emulsion, the amount of emulsifier preferably is 1–5% by weight, whereas, if the alkyd composition is a microemulsion, the amount of emulsifier preferably is 5–20% by weight.

As to suitable carboxylic acids (RCOOH), wherein R has the meaning stated above, mention may be made of dried fatty acids, such as C-18 fatty acids containing two double bonds, e.g., 9,12-octadecadienoic acid (linoleic acid) and 9,11-octadecadienoic acid (dehydrated ricinoleic acid), and C-18 fatty acids containing three double bonds, e.g., 9,12,15-octadecatrienoic acid (linolenic acid), 9,11,13-octadecatrienoic acid (eleostearic acid) and 4-keto-9,11,13-octadecatrienoic acid (licanic acid). Also longer polyunsaturated fatty acids, such as 5,8,11,14-eicosatetraenoic acid (arachidonic acid) and 5,8,11,14,17-eicosapentaenoic acid, can be used. For reasons of economy, one does not usually employ pure fatty acids, but mixtures derived from natural triglycerides. Suitable natural triglycerides include linseed oil, soya bean oil, tall oil, wood oil, sunflower oil and fish oil. Dehydrated castor oil is another triglyceride that may conveniently be used.

The alkoxylate is produced e.g., by aminolysis of the corresponding triglycerideor methyl ester with a suitable 2-amino alkanol, followed by alkoxylation of the obtained amide in the presence of an alkaline catalyst at a temperature of 150°–180° C. Alkoxylation is preferably carried out in the presence of a tertiary amine lacking protons that react with alkylene oxide, or an alkylene-oxide-quaternised derivative of the tertiary amine at a temperature ranging from room temperature to 120° C., in which case high yields of the desired product can be obtained. Suitable tertiary amines include trimethylamine, triethylamine, tributylamine, dimethyloctylamine, tetramethylethylenediamine, dimethyl coconut amine, tristearyl amine, dimethyl piperazine and diazabicyclooctane. Alkoxylation may comprise ethoxylation, propoxylation, accumulation of propylene oxide and ethylene oxide in blocks, simultaneous addition of ethylene oxide and propylene oxide or a combination thereof. The ethylene oxide conveniently amounts to at least 50 mole % of the added alkylene oxide. To use only ethoxylation is preferred.

Alkoxylation is carried out in such a manner that the emulsifier is given a suitable HLB value, usually 8–15. For a normal fraction containing polyunsaturated C-18 acids, e.g. derived from linseed oil, this corresponds, when only ethoxylation is used, to an addition of 3–18 moles of ethylene oxide per mole fatty acid monoethanolamine. It will be understood that the obtained ethoxylate always is a homologous mixture, since the alkoxylation, like most anionic polymerisation processes, results in a statistical distribution as to the degree of polymerisation.

The alkoxylate according to the invention undergoes autoxidative curing according to the same method as autoxidatively drying alkyds. If desired, the emulsifier according to the invention may also be combined with other surface-active agents or solubilisers, e.g., to improve the stability of the alkyd composition. Curing can be facilitated by certain metal salts, in particular cobalt and manganese salts, so-called driers. Drier-containing emulsions of drying alkyds with emulsifiers in the form of alkoxylates of the type described herein, result in a film which, when fully cured, does not contain any or only a slight amount of free alkoxylate. Thus, the autoxidativety curing alkoxylate is bonded in the network formed by the cured binder. Since no alkoxylate, or only a slight amount thereof, is present in the film, the latter has excellent properties as to e.g., hardness, gloss, clarity, water and chemical resistance. The drying properties are also promoted in that the alkoxylate participates in the curing process.

DESCRIPTION OF THE PREFERRED EMBODIMENTS

The invention will be further elucidated by the following Examples.

EXAMPLE 1

Pigment Paint Based on an Alkyd Emulsion

A glossy paint based on 53% by weight of an alkyd emulsion with a dry content of 60% and containing 20% by weight of titanium dioxide, was formulated with different emulsifiers in an amount of 3%. Stable emulsions with a drop size of about 2 μm were obtained throughout after high-pressure homogenisation. The alkyd had an oil length of 61% and was based on soya bean oil. The effect of the different emulsifiers on the film properties were established as to drying time, gloss, hardness and water resistance. The results are apparent from the Table below. The properties are graded on a scale from 10 (the best) to 1 (the worst).

TABLE 1

| Emulsifier | Drying time | Gloss | Hardness | Water resistance |
|---|---|---|---|---|
| Linseed oil fatty acid monoethanolamide - 7 EO | 8 | 9 | 8 | 8 |
| Wood oil fatty acid monoethanolamide - 7 EO | 9 | 8 | 9 | 8 |
| Nonyl phenol - 10 EO | 6 | 7 | 6 | 6 |
| C16–18 alcohol 8 EO | 6 | 7 | 5 | 6 |

As appears from the Table, the autoxidatively curing alkoxylate results in better film properties than the conventional emulsifiers.

EXAMPLE 2

Non-Pigment Lacquer Based on an Alkyd Emulsion

A non-pigment lacquer based on 59.5% by weight of an alkyd emulsion with a dry content of 60% was formulated with different emulsifiers in an amount of 2.5%. Emulsions of excellent stability and with a drop size of 1–2 μm were obtained throughout after ultrasound homogenisation. The alkyd had an oil length of 66% and was based on tall oil fatty acid. The effect of the different emulsifiers on the film properties were established as to drying time, clarity, hardness and water resistance. The results are apparent from the Table below, where the properties are graded on a scale from 10 (the best) to 1 (the worst).

TABLE 2

| Emulsifier | Drying time | Clarity | Hardness | Water resistance |
|---|---|---|---|---|
| Linseed oil fatty acid monoethanolamide - 8 EO | 7 | Clear | 8 | 8 |
| Linseed oil fatty acid monoethanolamide - 9 EO | 7 | Clear | 7 | 8 |
| Nonyl phenol - 11 EO | 5 | Hazy | 5 | 6 |

As appears from the Table, the autoxidatively curing alkoxylates result in better film properties than the conventional emsulsifier.

EXAMPLE 3

Non-Pigment Lacquer Based on a Microemulsion of an Alkyd

A microemulsion of an alkyd having an oil length of 64% and based on linseed oil, was formulated as follows: 40% by weight of alkyd, 15% by weight of emulsifier, 10% by weight of butyl diethylene glycol, 5% by weight of triethanolamine, the balance being additives and water. Different emulsifiers were tested, and their effect on the film properties was established as to drying time, clarity, hardness and water resistance. The results are apparent from the Table below, where the properties are graded on a scale from 10 (the best) to 1 (the worst).

TABLE 3

| Emulsifier | Drying time | Clarity | Hardness | Water resistance |
|---|---|---|---|---|
| Linseed oil fatty acid monoethanolamide - 6 EO | 6 | Clear | 5 | 7 |
| Wood oil fatty acid monoethanolamide - 6 EO | 6 | Clear | 6 | 8 |
| Nonyl phenol - 9 EO | 3 | Hazy | 2 | 5 |
| C16–18 alcohol - 8 EO | 3 | Hazy | 3 | 4 |

As appears from the Table, the autoxidatively curing alkoxylates result in superior film properties, such as drying time and water resistance, compared with the conventional emulsifiers.

What is claimed is:

1. An alkyd composition which is one of an aqueous emulsion or an aqueous microemulsion and which is autoxidatively drying, comprising:

an alkyd which is autoxidatively-drying; and an emulsifier which at least partly consists of an alkoxylate of monoalkanolamide of the general formula:

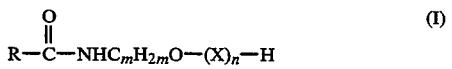  (I)

wherein R is a polyunsaturated alkyl group having 7–23 carbon atoms, X is an alkyleneoxy group derived from an alkylene oxide having 2–3 carbon atoms, m is 2–4, and n is 2–30.

2. The alkyd composition of claim 1, wherein R is derived from a fatty acid of the formula RCOOH, and wherein R is a polyunsaturated alkyl group having 9–21 carbon atoms.

3. The alkyd composition of claim 2, wherein R is derived from an oil selected from the group consisting of linseed oil, tall oil, and soya bean oil.

4. The alkyd composition of claim 1, wherein at least 50% of all X's are derived from ethylene oxide.

5. The alkyd composition of claim 4, wherein the alkoxylate has a HLB value ranging from 8 to 15.

6. The alkyd composition of claim 1, wherein m is 2.

7. The alkyd composition of claim 1, wherein the alkoxylate amounts to from 0.5 to 25% by weight of the alkyd composition.

8. The alkyd composition of claim 7, wherein the alkyd composition is an emulsion and contains from 1 to 5% by weight of the alkoxylate.

9. The alkyd composition of claim 7, wherein the alkyd composition is a microemulsion and contains from 5 to 20% by weight of the alkoxylate.

10. The process of emulsifying and applying an alkyd composition, the alkyd composition including an alkyd which is aqueous and autoxidatively- drying, comprising:

providing an emulsifier which at least partly consists of an alkoxylate of a monoalkanolamine having a general formula:

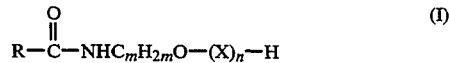  (I)

wherein R is a polyunsaturated alkyl group having 7–23 carbon atoms, X is an alkyleneoxy group derived from an alkylene oxide having 2–3 carbon atoms, m is 2–4, and n is 2–30;

admixing the emulsifier with the alkyd composition to provide an emulsified alkyd composition; and applying the emulsified alkyd composition to a substrate.

* * * * *